May 21, 1963

H. B. STUMP 3,090,653

HAND TOOLS

Filed July 2, 1959

INVENTOR.
Harry B. Stump
BY
ATTORNEY

May 21, 1963

H. B. STUMP 3,090,653

HAND TOOLS

Filed July 2, 1959

INVENTOR.
Harry B. Stump
BY
*Helen Singh*
ATTORNEY

INVENTOR.
Harry B. Stump

May 21, 1963

H. B. STUMP 3,090,653

HAND TOOLS

Filed July 2, 1959

INVENTOR.
Harry B. Stump
BY
ATTORNEY

United States Patent Office 3,090,653
Patented May 21, 1963

3,090,653
HAND TOOLS
Harry B. Stump, Charleston, W. Va., assignor to True Temper Corporation, Cleveland, Ohio, a corporation of Ohio
Filed July 2, 1959, Ser. No. 824,600
4 Claims. (Cl. 306—33)

This invention relates to tool heads and relates more particularly to improved means for attaching said heads to handles therefor and relates particularly to tools of the striking and edge tool type, such as axes, adzes, hatchets, hammers and the like.

An object of the present invention is to effectively secure handles to tools of the type referred to which is characterized by a firm union between the head and the handle so that danger of slippage of the head from the handle will be eliminated.

Another object of the invention is to provide improved means for retaining wedges which may be driven into the end of a handle within the said handle.

Still a further object of the invention is to provide improved means for providing an integral bond between the said wedges and the handle of the tool.

Another object of the invention is to provide improved means for securing the outer walls of the handle and the head of the tool together.

A still further object of the invention is to reinforce the attachment of the head and the handle at portions subject to the greatest torque or twisting force when the tool is in use.

Still a further object of the invention is to provide improved means for physically and chemically securing the head of the tool and the handle inserted therein together.

Another object of the invention is to provide an improved method for accomplishing the aforesaid objects.

Still a further object of the invention is to provide an improved means of attachment and improved method of attaching the tool handle and head together which will be inexpensive to manufacture and highly efficient in use.

Other objects of the invention and the invention itself will become more readily apparent by reference to the accompanying description, in which description reference will be made to the appended drawings, in which drawings.

Figure 1:
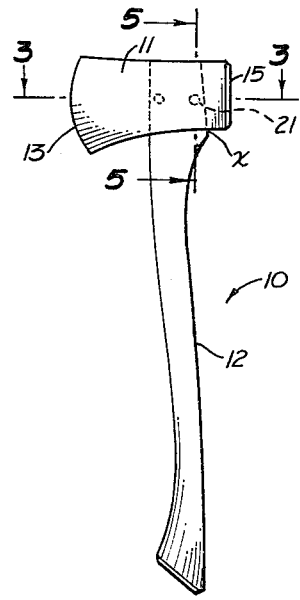
FIG. 1 is an elevational view of an axe incorporating one embodiment of this invention.

Referring now to the drawings, in all of which like parts are designated by like reference characters (and referring more particularly to certain embodiments of my invention thereof illustrated in FIGS. 1 to 11, 14 to 17 inclusive), an axe is illustrated generally by reference character 10, said axe being specially constructed to facilitate the attachment between the head 11 and handle 12 of the said axe.

The head 11 is provided with a generally arcuate forward cutting edge 13 and a preferably generally oval-shaped open eye 14 interposed between the cutting edge 13 and an opposite butt end portion 15. The eye is, in the single bit axe form shown herein, of generally tear-drop form and the inner walls of the eye are provided on opposite faces thereof with longitudinally disposed preferably uniformly dimensioned vertically disposed ribs 16. In the form shown in FIGS. 1 to 11, the ribs extend from the entrance of the head to the exit edge therefor, as best shown in FIG. 8. Said ribs are shown evenly spaced from each other and are disposed in alignment with ribs on the lateral opposite side of said eye. It is contemplated however, that the ribs may be differently positioned as, for example, in the form of FIGS. 12 and 13 and the eye is provided with ribs on all sides of the head of the hammer, and it is not essential that the ribs be oppositely located, etc. The arcuate rearward end wall 17 of the eye and the forward generally U-shaped end 18 of the eye, in FIGS. 1 to 11 and 14 to 17, are, however, preferably non-ribbed.

Figure 2:
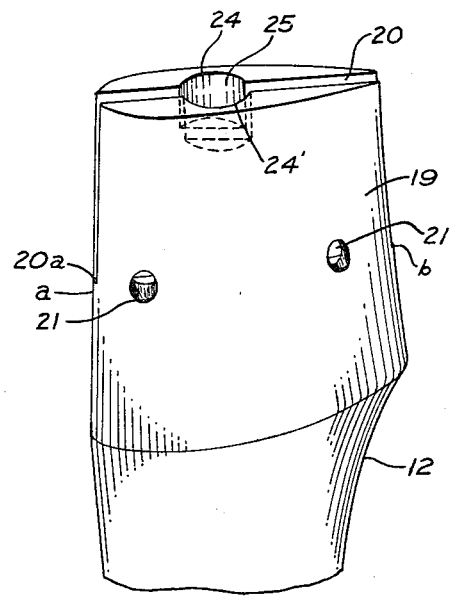
FIG. 2 is a perspective view of the upper or shank end of the axe handle.
Figure 3:
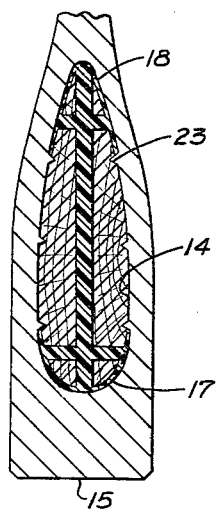
FIG. 3 is a view taken along the line 3—3 of FIG. 1.
Figure 4:
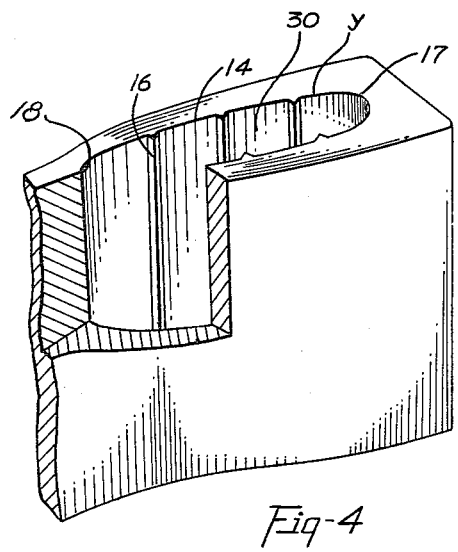
FIG. 4 is a perspective view in partial section of the head of the axe.
Figure 5:
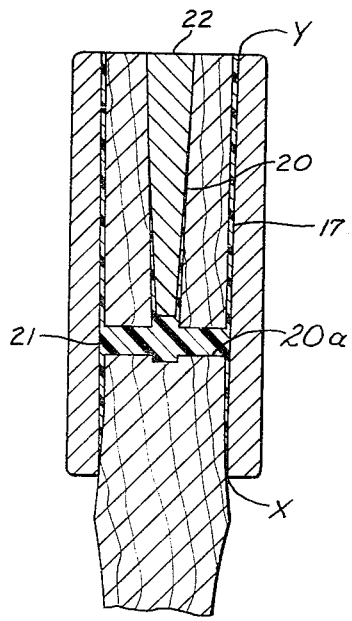
FIG. 5 is a view taken along the line 5—5 of FIG. 1.

The upper end of the handle 12 is preferably provided with a generally necked-in or tapered end 19, and said upper portion of the handle, is preferably constructed of wood, although handles of metal or of fibreglass or other compositions might be employed. In the form of FIGS. 1 to 5 inclusive and FIGS. 9 to 11 inclusive, a saw-slot 20 is disposed longitudinally and medially of the upper end thereof which may additionally, as shown in FIGS. 1 to 5 inclusive, be provided with a pair of apertures or openings 21 on either side of said slotted upper portion of the handle communicating with said slot adjacent the bottom 20a thereof, as shown in FIG. 2, for a purpose later to be more fully described herein.

It will be understood that although the eye and the upper end of the handle, as shown in the first embodiment of my invention, is oval or tear-shaped, other forms may be used without departing from the spirit or scope of this invention.

Figure 9:
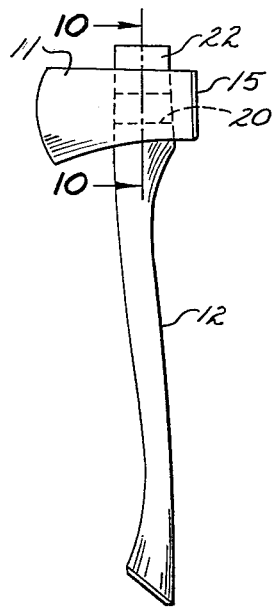
FIG. 9 is an elevational view of an axe showing the wedge thereof partially inserted and incorporating a third embodiment of this invention.
Figure 10:
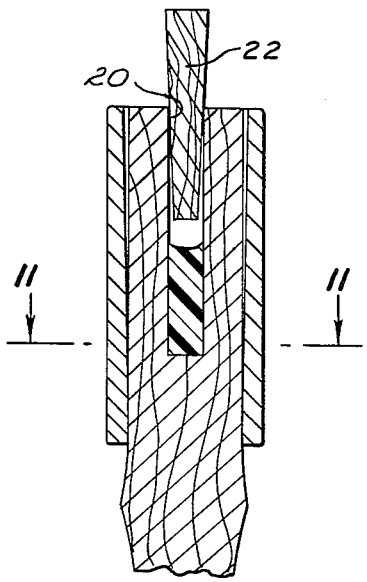
FIG. 10 is a view taken along the line 10—10 of FIG. 9.
Figure 11:
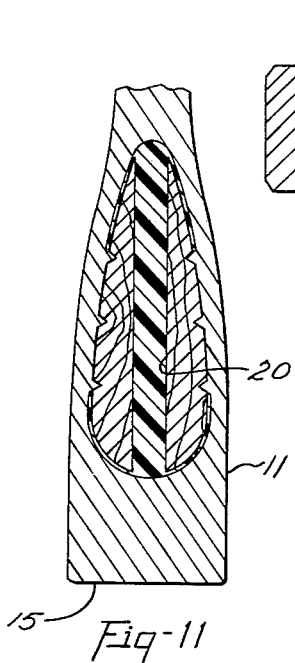
FIG. 11 is a view taken along the line 11—11 of FIG. 10.

It is to be noted that the eye of the head of the tool in such forms of my invention as employ wedges, is preferably provided with upwardly divergent tapered walls, as in the form of my invention shown in FIGS. 1 to 5 inclusive, and FIGS. 9 to 11 inclusive, and that the entrance end of the eye designated at "x" is preferably, in such embodiments, of relatively smaller dimension than the exit end thereof, designated at "y."

When the handle 2 is driven, therefore, into the head of the tool, the ribs 16 projecting inwardly of the inner walls of the head embed themselves in the handle forming vertically disposed grooves 23 therein mating with the ribs 16 a substantial distance along the length of the same; the ribs do not, however, embed themselves in the uppermost end of the handle after the handle has been completely driven into the head due to the greater spacing provided at such end.

Figure 14:
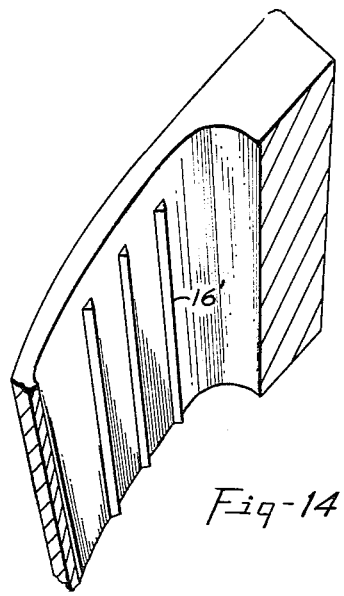
FIG. 14 is a view similar to FIG. 8 of a tool head showing a third embodiment of this invention.
Figure 15:
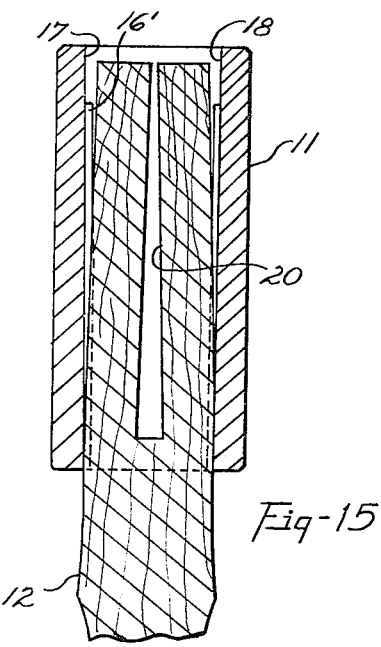
FIG. 15 is a vertical section showing the tool head of FIG. 14 in vertical section with a handle partly assembled thereto.
Figure 16:
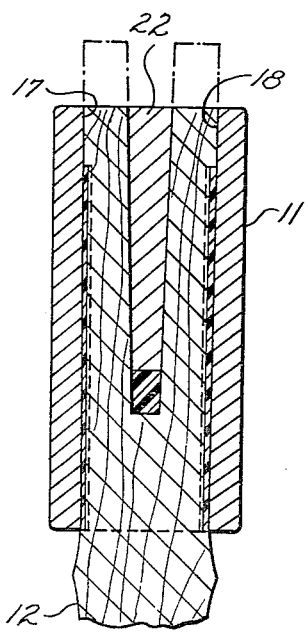
FIG. 16 is a view similar to FIG. 15 showing the head and handle completely assembled.

In the form of my invention shown in FIGS. 14 to 16 inclusive, the ribs 16' are illustrated as terminating short of the exit end of the eye of the head and the outward spreading force of the wedge forces the outer walls of the upper end of the handle against the upper unribbed walls 17, 18, 30 of the eye in pressure tight contact therewith and, in the form of my invention shown in FIGS. 1 to 5, and 9 to 11, the wedge forces the handle into the upper ends of the ribs provided in the upper end walls of the eye.

The saw slot 20, as best shown in FIG. 10, acts as a reservoir for adhesive material, preferably an epoxy resin, which will spill out the opposite bottom ends of the slot at "a" and at "b" in the form of FIGS. 1 to 5 inclusive and FIGS. 9 to 11 inclusive, and additionally in the form of FIGS. 1 to 5 where openings 21 are provided communicating with the slot, into the said openings 21 also, and into end contact thereby with portions associated therewith. To assist in more efficiently and quickly filling the slot reservoir 20 with epoxy or like adhesive, the slot is preferably provided with an additional reservoir 25 communicating with the said saw slot, formed, in the form of my invention shown in FIG. 2, by adding a centrally disposed curved recess 24—24' on either side of the upper edges of the saw slot. When a wedge is used, as in FIGS. 1 to 5 and FIGS. 9 to 11 inclusive, the wedge 22 is driven into the saw cut or saw slot 20 displacing a certain amount of the epoxy resin or adhesive, and driving or forcing the same under pressure of such wedge into contact with surrounding longitudinally extending portions of the end walls of the eye and the end walls of the handle associated therewith. Additional openings similar to the opening 25 may also be utilized.

It is preferable that the epoxy or adhesive material be distributed over virtually the entire confronting walls of either end of the eye and handle and limited in its coverage by the oppositely disposed ribs 16, 16' adjacent such ends, the ribs serving as end walls for such adhesive bond.

A residue of said adhesive adheres to the wedge and the surrounding wedge walls of the saw slot and bonds the wedge to longitudinally medial or centrally disposed portions of the upper portion of the handle, becoming integral therewith.

Figure 6:
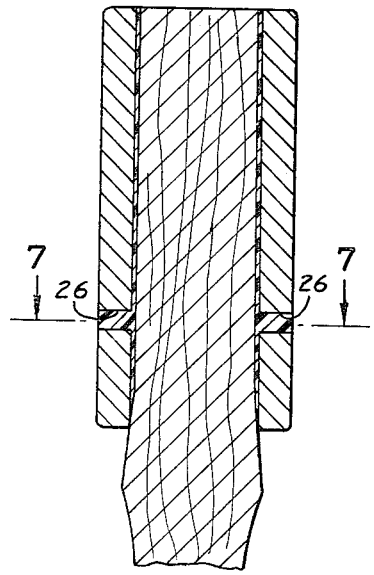
FIG. 6 is a view similar to FIG. 5 showing a second embodiment of the invention.
Figure 7:
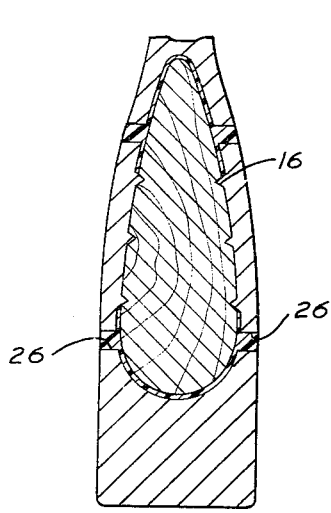
FIG. 7 is a view taken along the line 7—7 of FIG. 6.
Figure 8:
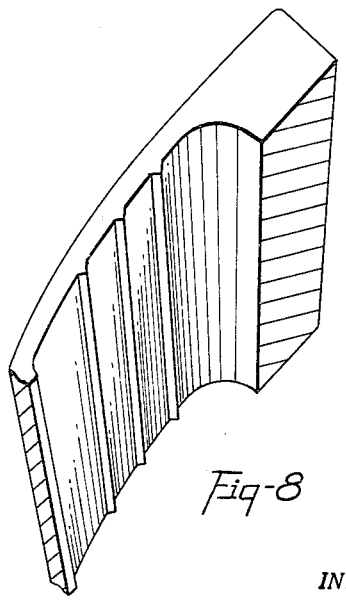
FIG. 8 is a sectioned perspective of the head of the axe.

In the form of the invention shown in FIGS. 6 and 7, openings 26—26 are provided in the axe head; a wedge is not employed and adhesive in a liquid state is introduced under pressure in any suitable manner through the said openings 26—26, the said adhesive being forced over the inner opposite end walls of the eye and associated handle portions.

Figure 17:
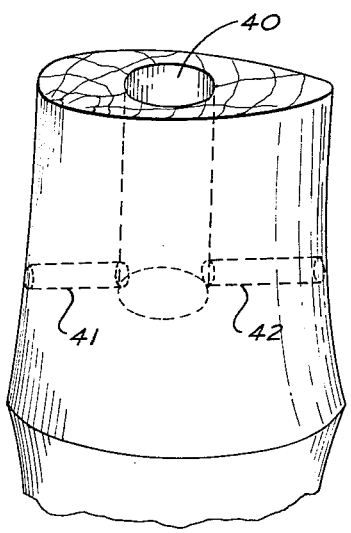
FIG. 17 is a perspective of a tool shank showing a fourth embodiment of the invention.

In FIG. 17, another form of my invention is shown, in which a wedge is not employed but which also utilizes the ribbed tool head eye of my invention. In this form of my invention the upper portion of the handle is provided with an adhesive receiving bore 40 vertically extending from the exit end of the handle to a mid-portion of the upper end of the handle where it communicates with transversely directed openings 41 and 42 wherefor the epoxy or other adhesive or cement introduced in the bore may flow, by gravity, into those end sections of the eye into which the openings 41 and 42 open. In such modification of my invention, the eye of the tool head would preferably be provided with straight rather than tapered walls and less spacing provided. A plurality of bores 40 may be provided when the cross-section extent is not great.

In the form of the invention, which employs the wedge, it will be noted that in the prior art when a wedge was employed to more securely fasten the handle to the tool head that the wedge had a tendency to split the fibres along the longitudinal medial axis of the handle creating a fissure which severely reduced the horizontal or longitudinal shear strength of the handle. The use of the saw slot as a reservoir for the adhesive and the use of the wedge as a driving means for distributing the adhesive or epoxy about the opposite walls of the eye to bond the handle to the eye and at the same time bond the wedge in its wedged relationship with the handle and the wedge, overcomes the prior difficulties encountered with wedges, the wedge being sealed in place so that it is not adversely affected by moisture or atmospheric conditions. The wedge also assists in driving the handle into greater interlocked engagement with the sides of the eye by exerting an expansive force upon the outer edges of the handle driving the ribs deeply into the handle and thus locking the same and creating a greater physical bond between the handle and the head of the tool.

In the form of my invention which does not employ a wedge, as shown in FIGS. 6, 7, and 17, the handle is both physically and chemically bonded to the head of the tool, as in the other forms, the ribs having a biting interlock with the sides of the handle and the epoxy resin or other adhesive cement forced under pressure into the space between the ends of the handle and the ends of the eye of the tool creating the chemical bond at the ends so that the handle is securely locked in engagement with the head at the portions of greatest stress. When the tool is in use, the ribs in all forms of my invention assist in resisting any "cocking" action of the tool by biting into the handle and restraining the lateral surfaces thereof from angling with respect to the eye. The chemical bonding action also tends to act as a reinforcement at such end portions.

Figure 12:
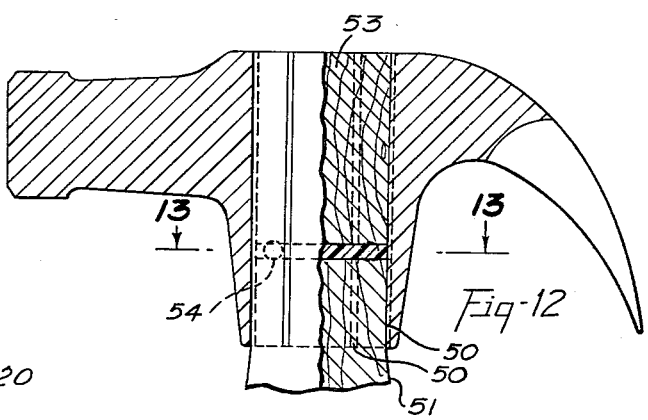
FIG. 12 is a longitudinal section of a portion of a hammer incorporating the invention as applied to a handle and socket of rectangular cross-section.
Figure 13:
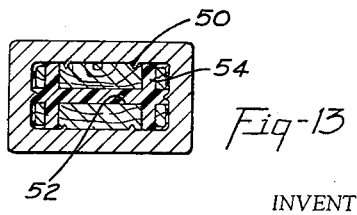
FIG. 13 is a section taken along the line 13—13 of FIG. 12.

Since my invention contemplates the application of this invention to different form tools, as for example, double bit axes, adzes, hatchets, hammers, etc., a hammer is illustrated in FIGS. 12 and 13 embodying my invention. In such form the eye of the head of the hammer is provided with ribs 50, and the hammer handle 51 is provided with a saw slot 52 into which epoxy cement or other adhesive is introduced, being driven by the force of a wedge 53 through disposed openings 54 in the upper end of the handle communicating with said saw slot wherefor the adhesive etc. is forced into contact with a section of the eye and handle portions disposed between adjacent ribs and the handle is alternately physically and chemically secured to the head.

While the foregoing describes this invention with certain improved embodiments thereof, it is well understood and known that numerous and extensive departures may be made therein without, however, departing from the spirit of the invention and the scope of the appended claims.

What I claim is:

1. A metallic head with a handle receiving eye, a handle having an end portion in engagement with the head, said head having vertically extending ribs on the inner surfaces of the eye embedded by the engagement of the handle in the walls of the handle thereby forming a physical interlock between said eye and said handle, an opening extending through said handle, said opening communicating with the top and ends of said end portion of said handle, bonding material disposed in said opening and in said space between contiguous eye and handle portions and between adjacent ribs whereby the head is bonded to the handle and the ribs act as end walls for such bonded portions.

2. A metallic head with a handle receiving eye, a handle having an end portion in engagement with the head, said head having vertically extending ribs on the inner surfaces of the eye thereof embedded by engagement of the handle in the outer walls of the handle thereby forming a physical interlock between said eye and said handle, a slot in the upper end of the handle, wedge means disposed within said slot, bonding material interposed between said wedge means and wedge surrounding longitudinally disposed inner walls of said handle and disposed between adjacent ribs in the head disposed on opposite open sides of said slot whereby said wedge is bonded to the handle and to said head, and said ribs act as end walls for such bonding material.

3. A metallic head with a handle receiving eye, a handle having an end portion in engagement with the head, said head having vertically extending ribs on the inner surfaces of the eye embedded by the engagement of the handle in the walls of the handle forming a physical interlock between the eye and the handle, a slot in the upper end of the handle, wedge means disposed within the slot, said slot communicating with the eye, said slot acting as a reservoir for bonding material, said bonding material being forced by said wedge between said wedge and handle portions surrounding said slot and between the head and the wedged handle to form a chemical bond between the head and said handle.

4. A striking or edge tool of the type described comprising a metallic head with a handle receiving eye and a work surface at one longitudinal end thereof, a handle having an end portion in engagement with the eye of the head, said head having vertically extending ribs on the lateral surfaces of the eye embedded by the engagement of the handle in the lateral walls of the handle, a longitudinally extending slot in the centrally disposed portion of the upper end of the handle, said slot communicating with the eye at the longitudinally disposed opposite ends of the eye, said slot acting as a reservoir for bonding material, a laterally disposed opening in said handle communicating with said slot, said opening being provided in the area adjacent an end of the slot and in the area between the said pair of ribs, a wedge, said bonding material forced by said driven wedge through said openings into the area of the eye adjacent the opposite ends of said slot and the head and handle being bonded together in such area, a pair of said ribs bounding such area.

References Cited in the file of this patent

UNITED STATES PATENTS

| | | |
|---|---|---|
| 704,819 | East | July 15, 1902 |
| 1,112,258 | Burton | Sept. 29, 1914 |
| 1,516,975 | McArthur | Nov. 25, 1924 |
| 2,263,198 | Valiton | Nov. 18, 1941 |
| 2,333,789 | Howard | Nov. 9, 1943 |
| 2,678,853 | Reeder | May 18, 1954 |
| 2,917,349 | Saylor et al. | Dec. 15, 1959 |
| 2,967,738 | Moore | Jan. 10, 1961 |

FOREIGN PATENTS

| | | |
|---|---|---|
| 174,733 | Switzerland | Apr. 1, 1935 |